United States Patent [19]

Huang et al.

[11] Patent Number: 4,945,493
[45] Date of Patent: Jul. 31, 1990

[54] METHOD AND SYSTEM FOR CORRECTING A ROBOT PATH

[75] Inventors: Bernard Huang, Ann Arbor, Mich.; Veljko Milenkovic, Sturgeon Bay, Wis.

[73] Assignee: Ford Motor Company, Dearborn, Mich.

[21] Appl. No.: 249,020

[22] Filed: Sep. 26, 1988

[51] Int. Cl.$^5$ .............................................. G06F 15/46
[52] U.S. Cl. .............................. 364/513; 318/568.19; 318/568.22; 318/568.23; 364/191; 901/9
[58] Field of Search ........... 364/513, 474.35, 191–193; 318/568.19, 568.22, 568.23; 901/2–7, 41, 42, 43, 9

[56] References Cited

U.S. PATENT DOCUMENTS

| | | | |
|---|---|---|---|
| 4,017,721 | 4/1977 | Michaud | 364/513 |
| 4,146,924 | 3/1979 | Birk et al. | 364/513 |
| 4,380,696 | 4/1983 | Masaki | 219/124.34 |
| 4,402,053 | 8/1983 | Kelley et al. | 364/513 |
| 4,432,063 | 2/1984 | Resnick | 364/513 |
| 4,433,382 | 2/1984 | Cunningham et al. | 364/513 X |
| 4,575,304 | 3/1986 | Nakagawa et al. | 414/730 |
| 4,575,802 | 3/1986 | Walsh et al. | 364/513 |
| 4,590,578 | 5/1986 | Barto, Jr. et al. | 364/513 |
| 4,639,878 | 1/1987 | Day et al. | 364/513 |
| 4,707,647 | 11/1987 | Coldren et al. | 364/513 X |

Primary Examiner—Joseph Ruggiero
Attorney, Agent, or Firm—Jerome R. Drouillard; Roger L. May

[57] ABSTRACT

A method and system for correcting a programmed robot manipulator path to compensate for variability of the location of a succession of workpieces includes the steps of sensing and measuring path offsets between the idealized workpiece location and the actual location of the workpiece at a plurality of waypoints, converting the measured offsets into translations and rotations of the workpiece by multiplying a matrix comprised of the offset measurements by a previously prepared conversion matrix, correcting the coordinates of waypoints within the preprogrammed path by applying the translations and rotations to such coordinates, transforming the corrected preprogrammed path coordinates into machine control coordinates, and providing a controller for the robot manipulator with such machine control coordinates.

7 Claims, 2 Drawing Sheets

METHOD AND SYSTEM FOR CORRECTING A ROBOT PATH

BACKGROUND OF THE INVENTION

1. Field of the Invention

This invention relates to a method and system for correcting the preprogrammed path of a robot manipulator to compensate for variability in the positioning of a workpiece.

2. Description of Related Art

A plethora of different types of robot manipulators is used in the industrial setting for performing a variety of tasks such as spray painting, spot welding, sealing, parts picking, and other operations. A common setting involves the use of a robot manipulator to perform the same operation upon a succession of workpieces. This requires that each workpiece be received into the workstation of the robot and be fixtured in place during the robot's operation upon the workpiece.

Certain operations performed by industrial robots, such as spray painting, do not require fine accuracy in terms of the positioning of the workpiece vis-a-vis the robot. Other types of operations such as sealant application, however, require that considerable precision be maintained in terms of the path swept by the robot in relation to the workpiece. Such precision may be obtained in two basic manners. First, the workpiece may be fixtured in place by means of a rigid holding mechanism. Although such mechanisms will generally produce acceptable results in terms of the placement of adhesives or other materials upon a workpiece, such equipment usually has an undesirable characteristic inasmuch as the time required for fixturing the workpiece adds appreciably to the total cycle time required for the operation.

An alternative to rigid fixturing of a workpiece involves placement of the workpiece in the approximate position required for the given operation followed by correction of the robot path to compensate for deviations from the idealized location of the workpiece. This is generally accomplished in a two-step process with the first step involving sensing of the precise location of the workpiece followed by correction of the robot path based upon the results of the sensing step. U.S. Pat. Nos. 4,017,721; 4,146,924; 4,380,696; 4,402,053; and 4,575,304 all disclose various details of systems which may be used for the purpose of sensing the position of a workpiece. These systems do not include a path correction method of the type disclosed herein. U.S. Pat. Nos. 4,432,063 and 4,433,382 disclose robot manipulators and control systems providing for movement of a robot manipulator on a piecewise digression from a preprogrammed path, followed by resumption of the program path. These systems do not include a system for correcting a robot path in the wholesale fashion taught by this specification. Finally, U.S. Pat. Nos. 4,639,878 and 4,707,647 disclose methods and systems for sensing the placement of a workpiece and for correcting the path of a robot manipulator based upon the location of the workpiece. The systems disclosed in the '878 and '647 patents require the solution of simultaneous equations by numerical techniques in order to obtain location data defining the position and attitude of the workpiece with respect to a fixed coordinate system. Such a method is both costly and time consuming.

It is an object of the present invention to provide a method and system for correcting a preprogrammed robot manipulator path to correspond with the various locations of a succession of workpieces without the need for solving excessive numbers of equations each time a workpiece is docked into the manipulator's work station.

It is an advantage of the present invention that a method and system according to this invention will allow speedy correction of a robot path with economical usage of computer resources.

It is a further advantage of the present invention that a system operating according to this invention is able to use a small number of measurement points, for example, one or two points, depending upon the type of operation being performed, the architecture of the workpiece and the type of workpiece fixturing employed. Two points will provide a sufficient amount of data for the sealing or welding of a substantially straight seam located on a workpiece. In contrast, the systems disclosed in the '878 and '647 patents always require data from at least three measurement points.

Other objects, features and advantages of the present invention will become apparent to those reading this specification.

SUMMARY OF THE INVENTION

According to the present invention, a method for correcting a programmed path for a robot manipulator to compensate for variability in the location of a workpiece comprises the steps of sensing and measuring offsets between the idealized location and the actual location of the workpiece at a plurality of points, converting such measured offsets into translations and rotations of the workpiece by multiplying a matrix comprised of the offset measurement by a previously prepared conversion matrix, correcting the coordinates of waypoints within the programmed path by applying such translations and rotations to said coordinates and transforming the corrected preprogrammed path coordinates into machine-controlled coordinates. Thereafter, the method further includes providing a controller for the robot manipulator with such machine control coordinates. The offsets may be measured at a plurality of waypoints extending along a path to be traversed by the robot manipulator. The conversion matrix used in this method is formed according to the steps of converting machine control coordinates corresponding to a plurality of waypoints along an idealized motion path for the robot manipulator into world space coordinates and unit measurement direction vectors, followed by arrangement of a measurement matrix having rows comprised of the components of the unit measurement direction vectors and the components of the vector cross-products of world space coordinates and the unit measurement vectors and finally, inverting such measurement matrix. The measurement matrix may be inverted according to several methods including the decomposition method.

A system for correcting a programmed path for a robot manipulator to compensate for variability in the location of a workpiece according to the present invention includes means for sensing and measuring path offsets between the idealized location and the actual location of a workpiece at a plurality of waypoints, and means for converting such measured offsets into translations and rotations of the workpiece by multiplying a matrix comprised of such offset measurements by a previously prepared conversion matrix. A system according to this invention may further include means for correcting the coordinates of waypoints within the preprogrammed path by applying such calculated translations and rotations to such waypoint coordinates, and means for transforming the corrected preprogrammed path coordinates into machine control coordinates and for providing a controller for such robot manipulator with such machine control coordinates. The means for sensing and measuring the path offsets in a system according to the present invention may comprise a single structured light device which projects a plane of light upon the workpiece and determines the position of the workpiece.

BRIEF DESCRIPTION OF THE DRAWINGS

FIG. 1 illustrates a world coordinate system and unit measurement vector system which may be employed with a path correction scheme according to the present invention.

DESCRIPTION OF THE PREFERRED EMBODIMENTS

Figure 1:
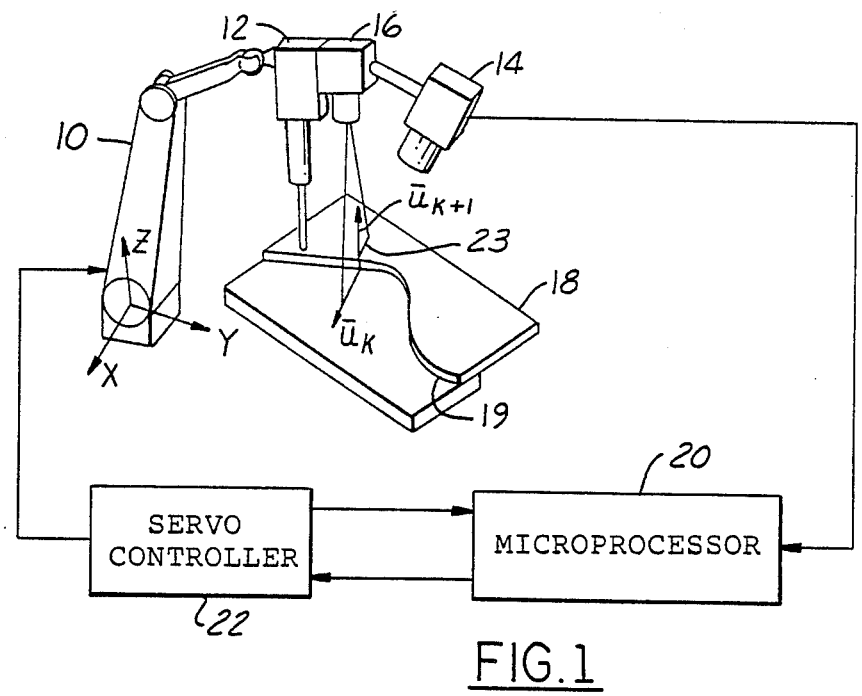
FIG. 1 is a schematic representation of a robot manipulator and control system according to the present invention.

FIG. 1 contains a schematic representation of a robot manipulator 10 including end effector 12. The end effector may comprise a sealant application gun, a paint spray gun, a welding device, a drill, or other types of tools known to those skilled in the art and suggested by this disclosure. In the present case, robot manipulator 10 is shown as causing end effector 12 to traverse workpiece 18 along locus of end effector operation 19. Locus 19 could comprise, without limitation, a weld seam, a seam to which sealer is to be applied, or a region which is to be machined by end effector 12.

Camera 14 and laser light source 16 are mounted adjacent to end effector 12. Although a laser light source is described herein, those skilled in the art will appreciate in view of this disclosure that similar structured light devices which project a plane of light upon the workpiece could be employed in practicing the present invention.

Laser light source 16 projects a plane of light which intersects with workpiece 18 along line 23 of FIG. 1. Camera 14 works in conjunction with microprocessor 20 to determine the offset of locus 19 by a triangulation method, for example. Such methods are known in the art to which this invention pertains and in general involve storing an idealized image of the workpiece, which is compared with an actual image which is created as camera 14 views the workpiece, including locus 19 at a 45 degree angle from the plane of laser light. U.S. Pat. No. 4,188,544, which discloses a method and apparatus for determining the offset location of a workpiece, is hereby incorporated by reference into this specification.

Figure 3:
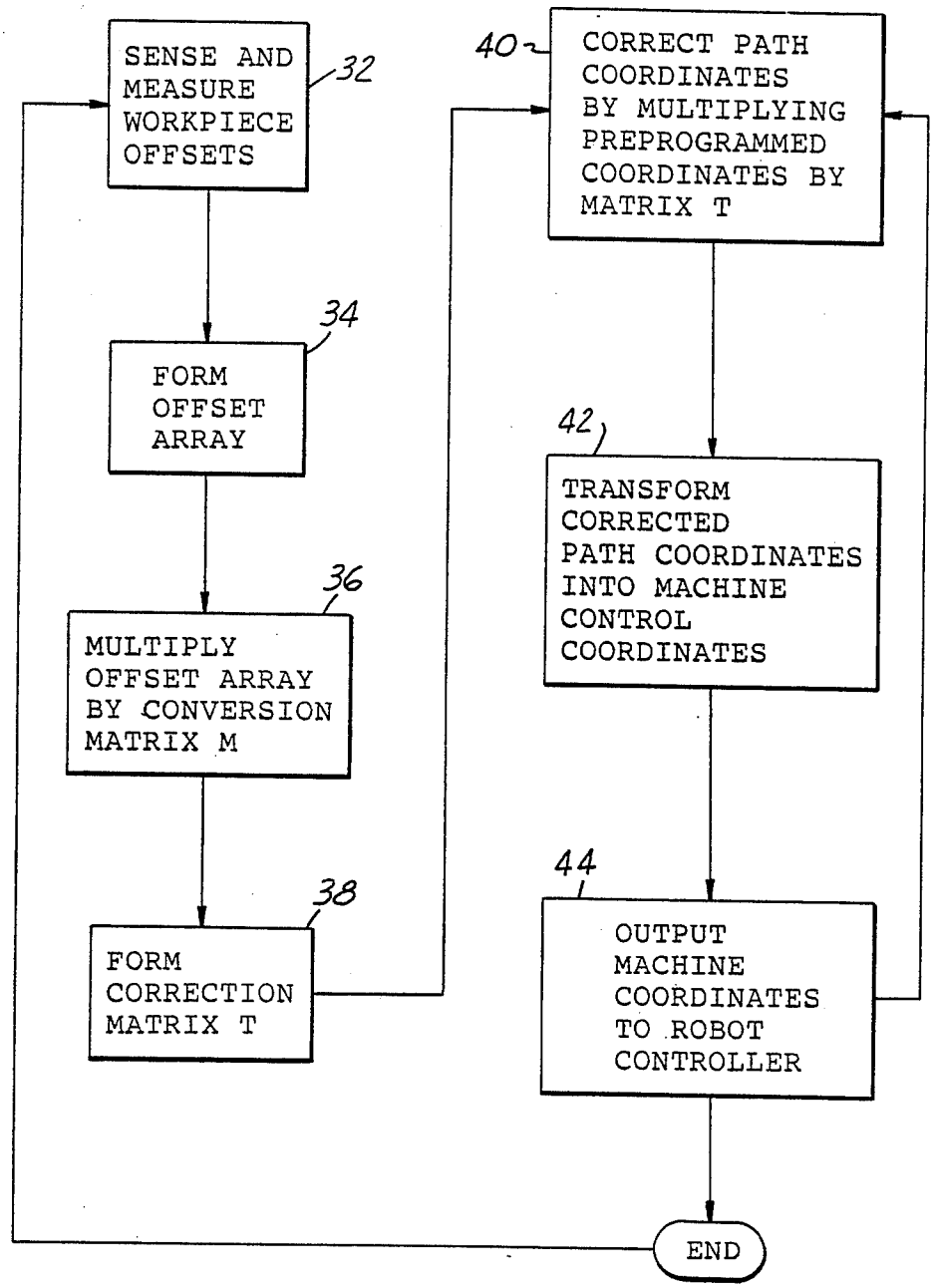
FIG. 3 is a flow diagram illustrating a system according to the present invention operating in the "run" mode.

Once camera 14 and microprocessor 20 have determined the offset measurements for a minimal number of measurements at several locations, a system according to the present invention will then be able to correct the preprogrammed robot path. This is performed as follows. First, as shown in FIG. 3, after the path offsets have been measured at block 32, the program within microprocessor 20 moves to block 34 wherein an offset array is formed. The offset array has the following form:

$$\Delta = \begin{bmatrix} \Delta y_1 \\ \Delta z_1 \\ \Delta y_2 \\ \Delta z_2 \\ \Delta y_3 \\ \Delta z_3 \end{bmatrix}$$

Here, two measurements, $\Delta y$ and $\Delta z$, have been taken at each of three measurement points. These two measurements, $\Delta y$ and $\Delta z$, are the offsets of the point where a seam or edge contained in a workpiece intersects the light plane along the y and z axes, respectively, of the camera coordinate system. The y and z axes are perpendicular to the seam and the x axis is parallel to the seam. It should be emphasized that this methodology uses the offsets of the point where a seam intersects the light plane instead of a fixed point on the seam. As a result, the offset $\Delta x$ of a fixed point, which cannot be measured, is not needed. A method and system according to the present invention may be employed with as few as a single measurement point, or as many as twenty or more points. Although a few points may be adequate for simple structures such as linear seams, more complex structures such as an automobile door may require 5 or 6 points. Those skilled in the art will appreciate in view of this disclosure that the use of additional points may require additional travel of the camera to added locations, which will, of course, increase the cycle time of the operation being performed by the robot.

Those skilled in the art will appreciate in view of this disclosure that a method according to the present invention could be practiced either with the disclosed single camera and structured light source or with multiple stationary cameras in conjunction with either structured or unstructured light. It will further be appreciated that offsets could be measured at any point on a workpiece comprising a rigid body.

Following formation of the offset array the computer moves to block 36. There the offset array is multiplied by a previously prepared conversion matrix "M" to yield a six component vector. The vector has the following form:

$$d = \begin{bmatrix} p_x \\ p_y \\ p_z \\ \delta_x \\ \delta_y \\ \delta_z \end{bmatrix}$$

where $p_x$, $p_y$, and $p_z$ and $\delta_x$, $\delta_y$ and $\delta_z$ represent the three-dimensional offsets and rotations of the workpiece from its idealized location.

Having performed the matrix multiplication, the program within microprocessor 20 moves to block 38, wherein correction matrix T is formed according to the following arrangement:

$$T = \begin{bmatrix} 1 & -\delta_z & \delta_y & p_x \\ \delta_z & 1 & -\delta_x & p_y \\ -\delta_y & \delta_x & 1 & p_z \\ 0 & 0 & 0 & 1 \end{bmatrix}$$

Having formed correction matrix T, the computer moves to block 40, wherein the coordinates of the idealized robot manipulator path, as set forth in a world coordinate system, are corrected by multiplying each of the preprogrammed coordinates by matrix T. The corrected world path coordinates are transformed at block 42 to machine control coordinates using any one of several known methods for performing this operation. One such method is described in "Kinematics of Major Robot Linkage", which was authored by the present inventors and which was published in the Proceedings of the 13th. International Symposium on Industrial Robots, 1983, Volume 2. This article is hereby incorporated by reference herein. Finally, at block 44 the corrected machine control coordinates are sent to servo controller 22 via microprocessor 20 so that the robot's end effector 12 may be guided precisely along locus 19 in workpiece 18. The steps contained within blocks 40–44 are repeated for each of the waypoints along the path the robot manipulator is programmed to traverse. With each new workpiece, the entire sequence is repeated, beginning with block 32.

Preparation of conversion matrix "M" is performed during a teaching phase of robot programming. Because the conversion matrix is formed only once, a system and method according to the present invention provides an economical use of computing resources insofar as the correction of the machine control coordinates to compensate for successive alignments of workpieces requires fewer calculations than conventional systems employing such methods as least squares or other types of solutions requiring the solving of large numbers of simultaneous equations representing differences between a preprogrammed robot path and the path necessitated by the actual orientation of a workpiece.

Figure 2:
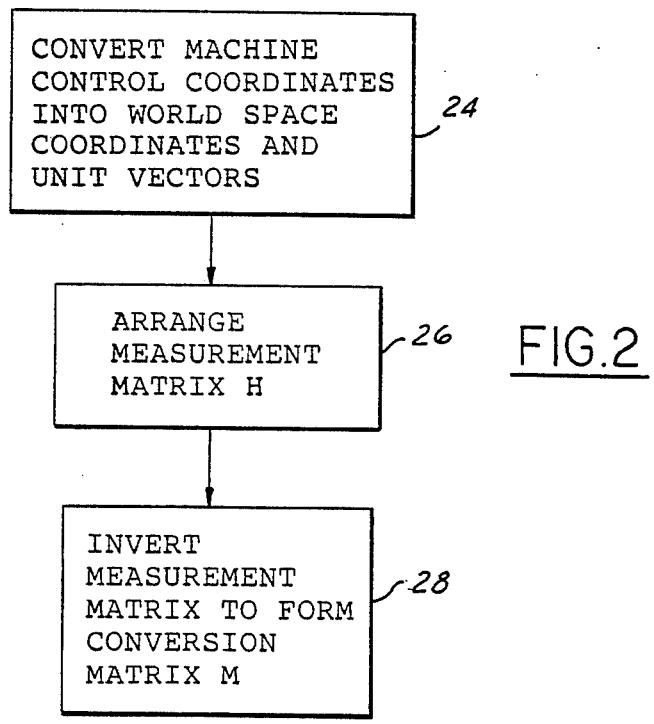
FIG. 2 is a flow diagram pertaining to the formation of a conversion matrix according to the present invention.

The first step in the formation of conversion matrix "M" is shown at block 24, FIG. 2, wherein machine control coordinates of the expected path of end effector 12 are converted into world space coordinates and unit direction vectors for a series of waypoints prescribing the anticipated path of end effector 12. The world space coordinates have the form $x_m^* = (x_m^*, y_m^*, z_m^*)$. The unit measurement direction vectors have the form $u_m = (u_{xm}, u_{ym}, u_{zm})$. For n measurement points, $m = 1, 2, \ldots 2n$. FIG. 1 shows the architecture of the world space coordinate and unit measurement direction vector systems used with a system and method according to this invention. At block 26, measurement matrix H is formed with the components of the unit measurement direction vectors and the components of the vector cross products of the world space coordinates and the unit measurement direction vectors. Each row of the measurement matrix is formed as follows:

$$[h_{mj}] = [u_{xm}, u_{ym}, u_{zm}, u_{zm}y_m^* - u_{ym}z_m^*,$$
$$u_{xm}z_m^* - u_{zm}x_m^*, u_{ym}x_m^* - u_{xm}y_m^*].$$

Note that there are 2n rows in the measurement matrix. For example, for two measurement points there are four rows in the measurement matrix.

Finally, at block 28 measurement matrix H is inverted to form conversion matrix M. This inversion may be done according to a variety of methods known to those skilled in the art and suggested by this disclosure. However, the decomposition method which is known to those skilled in the arts to which this invention pertains has proven to be useful for performing this operation.

The invention has thus been shown and described with reference to specific embodiments. However, it should be noted that the invention is in no way limited to the details of the illustrated method and apparatus; changes and modifications may be made without departing from the following claims.

We claim:

1. A method for correcting a programmed path for a robot manipulator to compensate for variability in the location of a workpiece, comprising the steps of:
  sensing and measuring offsets between the idealized location and the actual location of said workpiece at a plurality of points;
  converting said measured offsets into translations and rotations of the workpiece by multiplying a matrix comprised of said offset measurements by a previously prepared conversion matrix;
  correcting the coordinates of waypoints within said preprogrammed path by applying said translations and rotations to said coordinates;
  transforming said corrected preprogrammed path coordinates into machine control coordinates; and
  providing a controller for said robot manipulator with said machine control coordinates, wherein said conversion matrix is formed according to the steps of:
  converting said machine control coordinates corresponding to a plurality of waypoints along an idealized motion path into world space coordinates and unit measurement direction vectors;
  arranging a measurement matrix having rows comprised of the components of said unit measurement direction vectors and the components of the vector cross-products of said world space coordinates and said unit measurement vectors; and
  inverting said measurement matrix.

2. A method for correcting a programmed path for a robot manipulator according to claim 1 wherein said measurement matrix is formed so that each row has the following format:

$$[h_{mj}] = [u_{xm}, u_{ym}, u_{zm}, u_{zm}y_m^* - u_{ym}z_m^*,$$
$$u_{xm}z_m^* - u_{zm}x_m^*, u_{ym}x_m^* - u_{xm}y_m^*].$$

where:
  $u_{xm}, u_{ym}$ and $u_{zm}$ comprise the component parts of said unit measurement direction vectors and $x_m^*, y_m^*$ and $z_m^*$ comprise said world space coordinates.

3. A method for correcting a programmed path for a robot manipulator according to claim 2 wherein said measurement matrix is inverted according to the decomposition method.

4. A method for correcting a programmed path for a robot manipulator according to claim 1 wherein said offsets are measured at a plurality of waypoints extending along a path which is to be followed by said robot manipulator.

5. A system for correcting a programmed path for a robot manipulator to compensate for variability in the location of a workpiece, comprising:
   means for sensing and measuring path offsets between the idealized location and the actual location of said workpiece at a plurality of waypoints;
   means for converting said measured offsets into translations and rotations of the workpiece by multiplying a matrix comprised of said offset measurements by a previously prepared conversion matrix;
   means for correcting the coordinates of waypoints within said preprogrammed path by applying said translations and rotations to said coordinates;
   means for transforming said corrected preprogrammed path coordinates into machine control coordinates;
   means for providing a controller for said robot manipulator with said machine control coordinates; and
   means for providing said prepared conversion matrix wherein said conversion matrix comprises:
   world space coordinates and unit measurement direction vectors corresponding to a plurality of waypoints along a idealized motion path converted from said machine control coordinates; and
   an inverted measurement matrix having rows comprised of the components of said unit measurement direction vectors and the components of the vector cross-products of said world space coordinates and said unit measurement vectors.

6. A system according to claim 5 wherein said means for sensing and measuring path offsets comprises a single structured light device which projects a plane of light upon said workpiece and a single camera which determines the position of said workpiece.

7. A system according to claim 5 wherein said means for sensing and measuring path offsets comprises at least one unstructured light device which projects light upon said workpiece and a plurality of cameras which determine the position of said workpiece.

* * * * *